(12) United States Patent
Chen et al.

(10) Patent No.: US 10,078,166 B2
(45) Date of Patent: Sep. 18, 2018

(54) LIGHT GUIDE PLATE AND MANUFACTURE METHOD OF LIGHT GUIDE PLATE

(71) Applicants: Shenzhen China Star Optoelectronics Technology Co., Ltd., Shenzhen, Guangdong (CN); Wuhan China Star Optoelectronics Technology Co., Ltd., Wuhan, Hubei (CN)

(72) Inventors: Shih-Hsiang Chen, Guangdong (CN); Yingbo Zheng, Guangdong (CN)

(73) Assignees: Shenzhen China Star Optoelectronics Technology Co., Ltd., Shenzhen, Guangdong (CN); Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 176 days.

(21) Appl. No.: 14/901,044

(22) PCT Filed: Sep. 23, 2015

(86) PCT No.: PCT/CN2015/090396
§ 371 (c)(1),
(2) Date: Dec. 27, 2015

(87) PCT Pub. No.: WO2017/041328
PCT Pub. Date: Mar. 16, 2017

(65) Prior Publication Data
US 2017/0199314 A1 Jul. 13, 2017

(51) Int. Cl.
*B29D 11/00* (2006.01)
*G02B 6/00* (2006.01)
*F21V 8/00* (2006.01)
*B29K 33/00* (2006.01)

(52) U.S. Cl.
CPC ...... *G02B 6/0003* (2013.01); *B29D 11/00673* (2013.01); *B29D 11/00875* (2013.01); *G02B 6/0065* (2013.01); *G02B 6/0093* (2013.01); *B29K 2033/12* (2013.01)

(58) Field of Classification Search
CPC ........ B29D 11/00673; B29D 11/00875; G02B 6/0003; G02B 6/0065; G02B 6/0093
See application file for complete search history.

(56) References Cited

U.S. PATENT DOCUMENTS

2011/0176328 A1* 7/2011 Anandan et al.
2012/0258191 A1* 10/2012 Kim ..................... G02B 6/0036 425/385
2015/0187987 A1* 7/2015 Sim ................... G02F 1/133602 257/98

FOREIGN PATENT DOCUMENTS

| CN | 102628580 A | 8/2012 |
| CN | 102736166 A | 10/2012 |
| CN | 103032765 A | 4/2013 |
| CN | 104149323 A | 11/2014 |

(Continued)

*Primary Examiner* — Mathieu D Vargot
(74) *Attorney, Agent, or Firm* — Andrew C. Cheng

(57) ABSTRACT

The present invention provides a light guide plate and a manufacture method of the light guide plate. The light guide plate comprises an illuminating surface and a plurality of quantum dot modules, and the quantum dot module is filled with quantum dots, and the quantum dot module is embedded in the light guide plate, and the quantum dot modules are located close to the illuminating surface and the quantum dot modules are distributed in an array.

4 Claims, 7 Drawing Sheets

(56) References Cited

FOREIGN PATENT DOCUMENTS

| | | |
|---|---|---|
| CN | 104344328 A | 2/2015 |
| CN | 104566015 A | 4/2015 |
| CN | 104793284 A | 7/2015 |
| WO | 2015030037 A1 | 3/2015 |

\* cited by examiner

LIGHT GUIDE PLATE AND MANUFACTURE METHOD OF LIGHT GUIDE PLATE

CROSS REFERENCE

This application claims the priority of Chinese Patent Application No. 201510574558.5, entitled "Light guide plate and manufacture method of light guide plate", filed on Sep. 10, 2015, the disclosure of which is incorporated herein by reference in its entirety.

FIELD OF THE INVENTION

The present invention relates to a flat display field, and more particularly to a light guide plate and a manufacture method of the light guide plate.

BACKGROUND OF THE INVENTION

The Liquid Crystal Display (LCD) is a common electronic device, and possesses properties of low power consumption, small volume and light weight. Therefore, it has been favored by the users. The Liquid Crystal Display comprises a liquid crystal display panel and a backlight module. The backlight module is located close to the liquid crystal display panel and employed to provide an area light source for the liquid crystal display panel. Generally, the backlight module comprises a light source and a light guide plate. The light emitted from the light source enters the light guide plate through the incident surface of the light guide plate. After being diffused with the light guide plate, the light exits through the illuminating surface of the light guide plate and provides an area light source for the liquid crystal display panel. The quantum dots can be utilized to emit spectrally concentrated, very pure mono lights for achieving the better image colors. Therefore, it is considered to surpass the traditional phosphor property and possible to be applied in the backlight module. At present, the quantum dot application in the backlight module can be a quantum dot film. Generally, the quantum dot film is cut and applied in the backlight module. However, the unstability of the quantum dots, the edge of the quantum dot film in a certain range (such as, about 1 mm) after being cut can easily react with the oxygen or water vapor in the air. Consequently, the edge can be fail after the quantum dot film is cut. The quality of the light emitted from the edge of the quantum dot film after being cut is affected. Moreover, the performance of the display image of the liquid crystal display device is influenced.

SUMMARY OF THE INVENTION

The present invention provides a light guide plate, wherein the light guide plate comprises an illuminating surface and a plurality of quantum dot modules, and the quantum dot module is filled with quantum dots, and the quantum dot module is embedded in the light guide plate, and the quantum dot modules are located close to the illuminating surface and the quantum dot modules are distributed in an array.

The light guide plate further comprises a substrate and an isolation layer, and the substrate comprises a first surface, and accommodation parts which appear to be distributed in array are formed on the first surface, and the accommodation part is filled with the quantum dots, and the isolation layer covers the first surface of the substrate to make the accommodation parts and the quantum dots form the quantum dot modules, and the isolation layer is employed to isolate water vapor and oxygen, and a surface of the isolation layer away from the first surface is the illuminating surface.

The accommodation part is a recess, or an appearance of the accommodation part is a circular arc.

The present invention further provides a manufacture method of a light guide plate, wherein the manufacture method of the light guide plate comprises:

providing a substrate and the substrate comprises a first surface;

forming accommodation parts which appear to be distributed in array on the first surface;

filling quantum dots in the accommodation part;

covering the first surface of the substrate with an isolation layer.

The step of providing a substrate and the substrate comprises the first surface comprises:

providing a substrate formation device, and the substrate formation device is employed to manufacture the substrate with substrate material of molten state, and the substrate formation device comprises a first press roller and a second press roller, and a first predetermined gap is set between the first press roller and the second press roller, and the first press roller is formed by rigid material, and the second press roller is formed by elastic material, and the substrate material of molten state passes through the first predetermined gap between the first press roller and the second press roller, and cools down to form the substrate.

The step of forming the accommodation parts which appear to be distributed in array on the first surface comprises:

providing a third press roller and a fourth press roller wherein a surface of the third press roller is a smooth surface, and a surface of the fourth press roller is provided with bulges, and the third press roller is set at a first temperature, and the fourth press roller is set at a second temperature, and the first temperature is smaller than the second temperature and also smaller than a melt point of the substrate material, and a second predetermined gap is set between the third press roller and the fourth press roller;

the substrate passes through the second predetermined gap between the third press roller and the fourth press roller, and the accommodation parts which are distributed in array on a surface of the substrate which is close to the fourth press roller, and the surface where the accommodation parts are formed is defined to be the first surface.

The substrate material is plastic material, and the melt point of the substrate material is 220° C., and the first temperature is 180° C., and the second temperature is 200° C.

The step of filling the quantum dots in the accommodation parts comprises:

providing a fifth press roller, and the fifth press roller comprises a recess, and the recess is loaded with quantum dots, and when the fifth press roller rotates on the first surface, the quantum dots in the recess falls into the accommodation parts to fill the quantum dots in the accommodation parts.

The step of covering the first surface of the substrate with the isolation layer comprises:

coating isolation material on the first surface, and sealing the accommodation parts, and the isolation material is employed to isolate water vapor and oxygen;

solidifying the isolation material to form the isolation layer.

The step of solidifying the isolation material to form the isolation layer comprises:

implementing UV solidification to the isolation material to form the isolation layer.

In comparison with prior art, the quantum dot modules are embedded in the light guide plate according to the light guide plate of the present invention, and the quantum dot modules are located close to the illuminating surface. Thus, the quantum dots in the quantum dot modules hardly react with the oxygen and water vapor in the air. The quality of the light illuminating from the light guide plate can be promoted and the display image performance of the liquid crystal display device utilizing the light guide plate can be promoted in advance.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
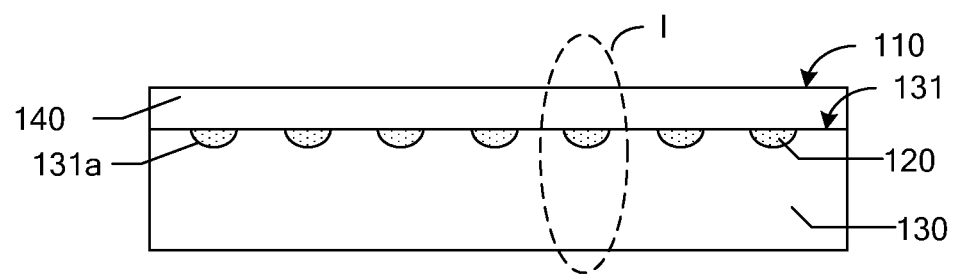
FIG. 1 is a structure diagram of a light guide plate according to a preferred embodiment of the present invention.
Figure 2:
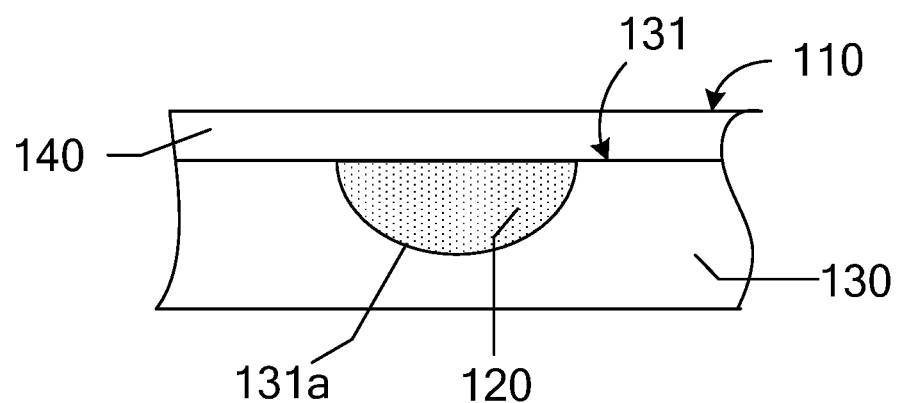
FIG. 2 is an enlarged structure diagram of I position in FIG. 1.

Please refer to FIG. 1 and FIG. 2. FIG. 1 is a structure diagram of a light guide plate according to a preferred embodiment of the present invention; FIG. 2 is an enlarged structure diagram of I position in FIG. 1. The light guide plate 100 comprises an illuminating surface 110 and a plurality of quantum dot modules 120, and the quantum dot module 120 is embedded in the light guide plate 100, and the quantum dot modules 120 are located close to the illuminating surface 110 of the light guide plate 100 and the quantum dot modules 120 are distributed in an array.

The light guide plate 100 is made of plastic material, such as polymethyl methacrylate (PMMA). The PMMA material has stronger moisture absorption ability and better airtightness. The heat conductivity of the PMMA material is weaker. The PMMA is selected to be the material of the light guide plate 100. Thus, the light guide plate 100 can well isolates the heat generated by the light source to prevent the annihilation of the quantum dots in the quantum dot modules 120 as being heated. Meanwhile, the PMMA material has better US transmittance. Therefore, the light guide plate 100 hardly becomes yellow to have the yellowing phenomenon.

By irradiating the quantum dot modules 120 with the light, the quantum dots inside the quantum dot modules 120 can be excited and generate pure color light with high chromaticity. The light emitted from the light source and the pure color light with high chromaticity which is excited inside the quantum dot modules 120 are mixed to generate the while light with high chromaticity. The quantum dots are employed to convert the light generated by the light emitting diode into visible light or infrared light. The quantum dots are nanocrystals of which the diameters are smaller than bulk exciton Bohr radius. Due to the quantum confinement effect, the energy difference among the electronic states of the quantum dots is a function of the components and physical dimensions of the quantum dots. Therefore, the optical and optoelectronics properties of the quantum dots can be tuned and adjusted by changing the physical dimensions of the quantum dots. The quantum dots can absorb all wavelengths of which the peak wavelengths are shorter and emits light with longer wavelength. 2 nm CdSe quantum dot can emit light in blue region of the visible light, and 10 nm CdSe quantum dot can emit light in red region of the visible light. As the quantum dot is applied to the display technology, the quantum dots can be utilized to emit spectrally concentrated, very pure, high quality red/green mono lights, which completely surpass the phosphor property of the traditional light emitting diode backlight and realize better image colors. Therefore, the quantum dot display technology is considered to be the best solution of high performance, high display color gamut in the future, and even the new technical representative of the global display industry.

Specifically, the light guide plate 100 comprises a substrate 130 and an isolation layer 140, and the substrate 130 comprises a first surface 131, and accommodation parts 131a which appear to be distributed in an array are formed on the first surface 131, and the accommodation parts 131a are filled with the quantum dots. The isolation layer 140 covers the first surface 131 of the substrate 130 to make the accommodation parts 131a and the quantum dots form the quantum dot modules 120, and the isolation layer 140 is employed to isolate water vapor and oxygen, and a surface of the isolation layer 140 away from the first surface 131 is the illuminating surface 110. In one embodiment, the accommodation part 131a is a circular recess. In another embodiment, the accommodation part 131a has a cross-sectional shape that is a circular arc. When the accommodation part 131a is a circular arc, the light emitted from the light source enters the light guide plate 100. The accommodation part 131a of circular arc can act homogeneous diffusion function to the light entering the light guide plate 100. Accordingly, the light illuminated by the illuminating surface 110 of the light guide plate 100 can be more homogeneous.

In comparison with prior art, the quantum dot modules 120 are embedded in the light guide plate 100 according to the light guide plate 100 of the present invention, and the quantum dot modules 120 are located close to the illuminating surface 110. Thus, the quantum dots in the quantum dot modules 120 hardly react with the oxygen and water vapor in the air. The quality of the light illuminating from the light guide plate 100 can be promoted and the display image performance of the liquid crystal display device utilizing the light guide plate 100 can be promoted in advance.

Furthermore, the quantum dot module 120 is embedded in the light guide plate 100 according to the light guide plate 100 of the present invention. The design of the quantum dot module 120 can be performed according to the dimension of the light guide plate 100. The cutting to the quantum dot film according to prior art is not required. Therefore, the light guide plate 100 of the present invention does not have the technical issue of edge failure of the quantum dots after the quantum dot film is cut in prior art. When the light guide plate 100 of the present invention is applied in a liquid crystal display device, the liquid crystal display device with the light guide plate 100 can have a narrower frame.

Furthermore, in prior art, the quantum dot film is located on the illuminating surface of the light guide plate. When the light passes through the quantum dot film after passing through the light guide plate, interface exists between the light guide plate and the quantum dot film, and in normal condition, the material of the light guide plate and the material of the quantum dot film packaging the quantum dots are different, thus in prior art, as the light illuminates from the illuminating surface of the light guide plate and is out of the quantum dot film, the loss of the light will generate because of passing through too many interfaces. The quantum dot modules 120 are embedded in the light guide plate 100 according to the light guide plate 100 of the present invention. In other words, the quantum dot modules 120 are directly located in the light guide plate 100. Therefore, the light illuminated from the light guide plate 100 does not have to pass through one more interface. Therefore, the loss of the light illuminated from the light guide plate 100 according to the present invention is smaller than that of prior art. Consequently, the brightness of the light illuminated from the light guide plate 100 according to the present invention is raised.

Figure 3:
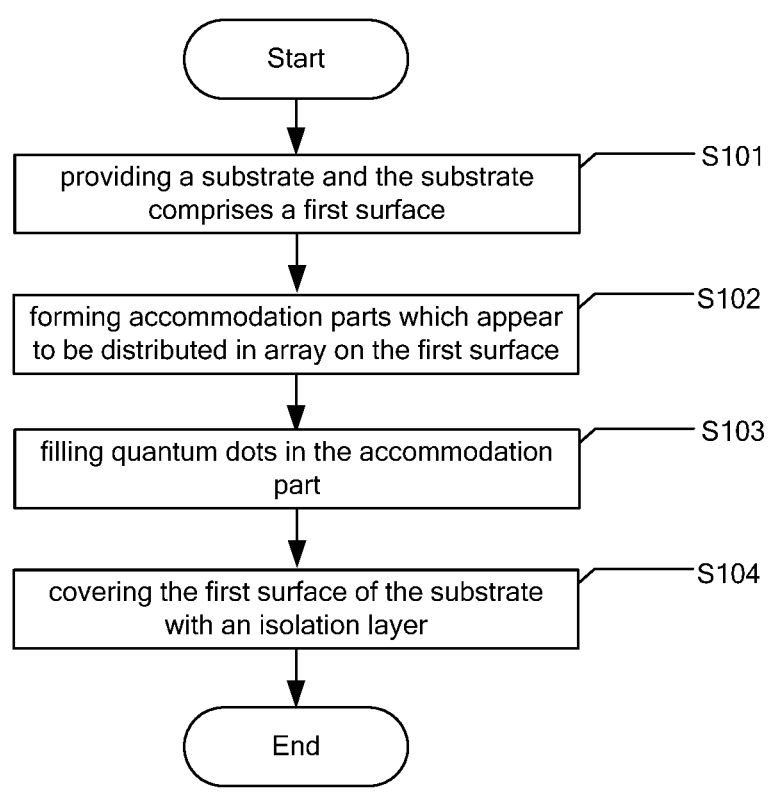
FIG. 3 is a flowchart of a manufacture method of a light guide plate according to a preferred embodiment of the present invention.
Figure 4:
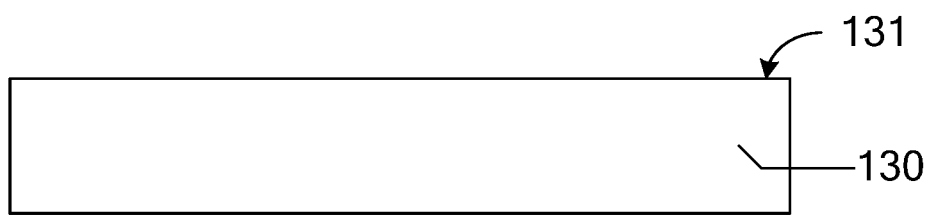
FIG. 4 is a structure diagram of a substrate according to a preferred embodiment of the present invention.
Figure 5:
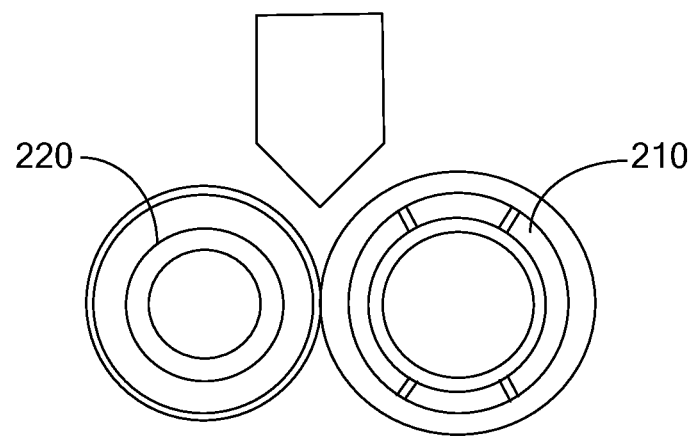
FIG. 5 is a structure diagram of a substrate formation device according to a preferred embodiment of the present invention.
Figure 6:
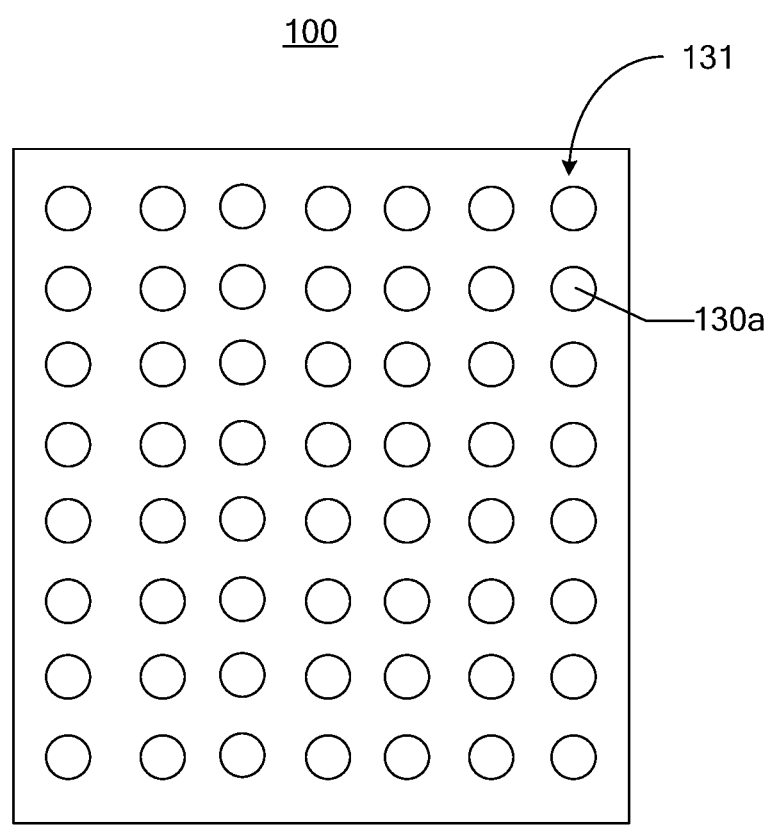
FIG. 6 is a structure diagram of a first surface of a substrate according to a preferred embodiment of the present invention.
Figure 7:
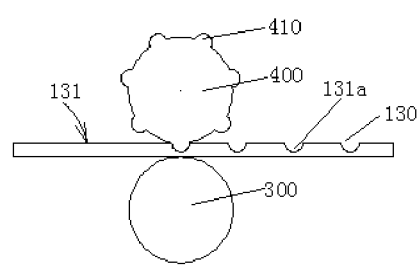
FIG. 7 is a diagram of manufacturing the structure of the substrate in FIG. 6 according to a preferred embodiment of the present invention.
Figure 8:
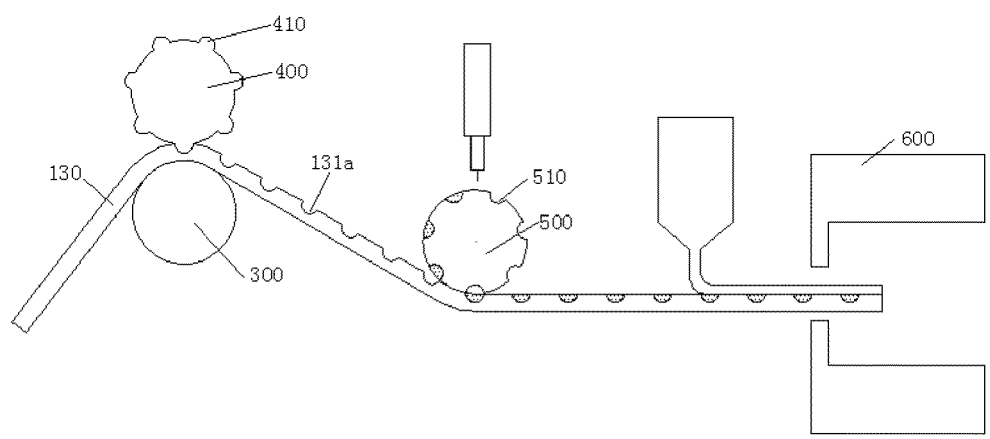
FIG. 8 is a diagram of accommodation parts of the substrate filled with quantum dots and covered with an isolation layer according to a preferred embodiment of the present invention.

With combination of FIG. 1 and FIG. 2, the manufacture method of the light guide plate according to the present invention is introduced. Please refer to FIG. 3. FIG. 3 is a flowchart of a manufacture method of a light guide plate according to a preferred embodiment of the present invention. The manufacture method of the light guide plate comprises following steps but is not limited thereto:

step S101, providing a substrate 130 and the substrate 130 comprises a first surface 131 as shown in FIG. 4. Specifically, with referring to FIG. 5, the step S101 comprises: providing a substrate formation device 220, and the substrate formation device 220 is employed to manufacture the substrate 130 with substrate material of molten state, and the substrate formation device 220 comprises a first press roller 210 and a second press roller 220, and a first predetermined gap is set between the first press roller 210 and the second press roller 220, and the first press roller 210 is formed by rigid material, and the second press roller 220 is formed by elastic material. The substrate material of molten state passes through the first predetermined gap between the first press roller 210 and the second press roller 220, and cools down to form the substrate 130. In this embodiment, the appearances of the first press roller 210 and the second press roller 220 are cylindrical. If both the first press roller 210 and the second press roller 220 are formed by rigid material. Then, as the substrate material is too much in part, and as passing through the first predetermined gap between the first press roller 210 and the second press roller 220, the more substrate material in part suffers a larger pressure from the first press roller 210 and the second press roller 220, and the inner stress of the formed substrate is larger; if the substrate material is less in part, and as passing through the first predetermined gap between the first press roller 210 and the second press roller 220, the less substrate material in part suffers a smaller pressure from the first press roller 210 and the second press roller 220, and the compactness of the formed substrate is worse. Consequently, the finally obtained substrate can be uneven or even warpage in part. In the present invention, the first press roller 210 is formed by rigid material, and the second press roller 220 is formed by elastic material. Then, as the substrate material passes through the first predetermined gap between the first press roller 210 and the second press roller 220, the pressure value generated by the nonuniform volume of the substrate material will be absorbed by the second press roller 220 which is formed by elastic material. Accordingly, the inner stress value uniformity of the substrate material can be ensured to reduce the roughness of the substrate and the warpage degree of the substrate.

step S102, forming accommodation parts 131a which appear to be distributed in array on the first surface 131 as shown in FIG. 6. Specifically, with referring to FIG. 7, the step S102 comprises the steps below.

step I, providing a third press roller 300 and a fourth press roller 400 wherein a surface of the third press roller 300 is a smooth surface, and a surface of the fourth press roller 400 is provided with bulges 410, and the third press roller 300 is set at a first temperature, and the fourth press roller 400 is set at a second temperature, and the first temperature is smaller than the second temperature and also smaller than a melt point of the substrate material, and a second predetermined gap is set between the third press roller 300 and the fourth press roller 400. In one embodiment, the substrate material is plastic material, such as polymethyl methacrylate (PMMA). The PMMA material has stronger moisture absorption ability and better airtightness. The heat conductivity of the PMMA material is weaker. The PMMA is selected to be the material of the light guide plate 100. Thus, the light guide plate 100 can well isolates the heat generated by the light source to prevent the annihilation of the quantum dots in the quantum dot modules 120 as being heated. Meanwhile, the PMMA material has better US transmittance. Therefore, the light guide plate 100 hardly becomes yellow to have the yellowing phenomenon. The melt point of the substrate material is 220° C., and the first temperature is 180° C., and the second temperature is 200° C. Then, the substrate 130 becomes soft but not melted. When the fourth press roller 400 with bulges 410 passed through the substrate 130, the appearance of the bulges 410 is transfer printed on one surface of the substrate 130 to form the accommodation parts 131a.

step II, the substrate 130 passes through the second predetermined gap between the third press roller 300 and the fourth press roller 400, and the accommodation parts 131a which are distributed in array on a surface of the substrate 130 which is close to the fourth press roller 400, and the surface where the accommodation parts 131a are formed is defined to be the first surface 131.

step S103, filling quantum dots in the accommodation part 131a. Please refer to FIG. 8. The step S103 comprises: providing a fifth press roller 500, and the fifth press roller 500 comprises a recess 510, and the recess 510 is loaded with quantum dots, and when the fifth press roller 500 rotates on the first surface 131, the quantum dots in the recess 510 falls into the accommodation parts 131a to fill the quantum dots in the accommodation parts 131a.

step S104, covering the first surface 131 of the substrate 130 with an isolation layer 140. The surface of the isolation layer 140 away from the first surface 131 of the substrate 130 is the illuminating surface 110 of the light guide plate 100. Please refer to FIG. 8, the step S104 comprises steps below.

step III, coating isolation material on the first surface 131, and sealing the accommodation parts 131a, and the isolation material is employed to isolate water vapor and oxygen.

step IV, solidifying the isolation material to form the isolation layer 140. In one embodiment, the step of solidifying the isolation material to form the isolation layer comprises: implementing UV solidification to the isolation material to form the isolation layer 140. As implementing UV solidification to the isolation material, an UV solidification stove is used for implementing UV solidification to the isolation material.

Above are embodiments of the present invention, which does not limit the scope of the present invention. Any modifications, equivalent replacements or improvements within the spirit and principles of the embodiment described above should be covered by the protected scope of the invention.

What is claimed is:

1. A manufacture method of a light guide plate, comprising the following steps:

providing a substrate, which comprises a first surface;

forming accommodation parts, which are arranged in an array on the first surface, wherein the accommodation parts are each a circular cavity having a circular arc cross section;

filling quantum dots in each of the accommodation parts; and covering the first surface of the substrate with an isolation layer such that the accommodation parts and the quantum dots filled in the accommodation parts are covered by the isolation layer, wherein the step of providing a substrate comprises:

providing a substrate formation device, which receives and processes a substrate material in a molten state to form the substrate, wherein the substrate formation device comprises a first press roller and a second press roller, and a first predetermined gap is set between the first press roller and the second press roller, and the first press roller is formed of a rigid material, and the second press roller is formed of an elastic material, wherein the substrate material of the molten state passes through the first predetermined gap between the first press roller and the second press roller, and cools down to form the substrate;

wherein the step of forming the accommodation parts comprises:

providing a third press roller and a fourth press roller, wherein a surface of the third press roller is a smooth surface, and a surface of the fourth press roller is provided with bulges, and the third press roller is set at a first temperature, and the fourth press roller is set at a second temperature, and the first temperature is smaller than the second temperature and also smaller than a melt point of the substrate material, and a second predetermined gap is set between the third press roller and the fourth press roller; and the substrate passing through the second predetermined gap between the third press roller and the fourth press roller, such that a surface of the substrate that is close to the fourth press roller is formed with the accommodation parts, and the surface where the accommodation parts are formed is defined as the first surface; and wherein the step of filling quantum dots in each of the accommodation parts comprises:

providing a fifth press roller, wherein the fifth press roller comprises a recess, in which the quantum dots are loaded, such that when the fifth press roller rolls on the first surface, the quantum dots in the recess falls into the accommodation parts to fill the quantum dots in the accommodation parts.

2. The manufacture method of the light guide plate according to claim 1, wherein the substrate material is a plastic material, and the melt point of the substrate material is 220° C., and the first temperature is 180° C., and the second temperature is 200° C.

3. The manufacture method of the light guide plate according to claim 1, wherein the step of covering the first surface of the substrate with an isolation layer comprises:

coating an isolation material on the first surface to seal the accommodation parts, so that the isolation material isolates the quantum dots filled in the accommodation parts from external water vapor and oxygen; and solidifying the isolation material to form the isolation layer.

4. The manufacture method of the light guide plate according to claim 3, wherein the step of solidifying the isolation material to form the isolation layer comprises:

implementing UV solidification to the isolation material to form the isolation layer.

* * * * *